United States Patent [19]

Diggs

[11] 4,030,890
[45] June 21, 1977

[54] SOLAR POWER SYSTEM

[76] Inventor: Richard E. Diggs, S. 12A Road, P.O. Box 776, Carthage, Mo. 64836

[22] Filed: Oct. 20, 1975

[21] Appl. No.: 624,409

[52] U.S. Cl. .................................. 23/281; 55/17; 55/456; 60/641; 60/721; 126/271; 165/DIG. 6; 423/579; 423/648 R

[51] Int. Cl.² .................... B01D 57/00; B01J 7/00; C01B 13/00; F24J 3/02

[58] Field of Search ................ 23/281, 282, 277 R, 23/252 R; 423/648, 579; 250/527; 204/157.1 R; 202/234; 126/270, 271; 165/DIG. 6; 55/17, 456

[56] References Cited

UNITED STATES PATENTS

| 2,372,155 | 3/1945 | Bosch | 165/DIG. 6 |
|---|---|---|---|
| 2,760,920 | 8/1956 | Olsen | 126/270 X |
| 2,914,915 | 12/1959 | Sziklas et al. | 165/DIG. 6 |
| 2,993,480 | 7/1961 | Huet | 55/456 X |
| 3,460,318 | 8/1969 | Creutz | 55/17 |
| 3,747,306 | 7/1973 | Wikdahl | 55/17 X |
| 3,901,668 | 8/1975 | Seitzer | 55/16 |
| 3,901,669 | 8/1975 | Seitzer | 55/16 |

Primary Examiner—Joseph Scovronek
Attorney, Agent, or Firm—Shoemaker and Mattare, Ltd.

[57] ABSTRACT

An apparatus and method for separating hydrogen and oxygen from water molecules. A solar reflecting means reflects solar energy onto a water containing tank to boil water contained therein and form steam. The steam is transferred either to a turbine-generator assembly for producing power, or to a dissociating means for producing hydrogen and oxygen. The steam in the dissociating means is forced to traverse a spiral path wherein it undergoes a circular motion to subject it to centrifugal force while contacting a heat transfer surface. Solar energy is concentrated on the heat transfer surface and heat in amounts sufficient to raise the temperature of the steam to the dissociation temperature thereof is transferred thereto. Hydrogen and oxygen are separated from each other by the centrifugal forces, and are withdrawn from the dissociating means. An electric starter and means for moving solar reflecting means are also disclosed.

10 Claims, 8 Drawing Figures

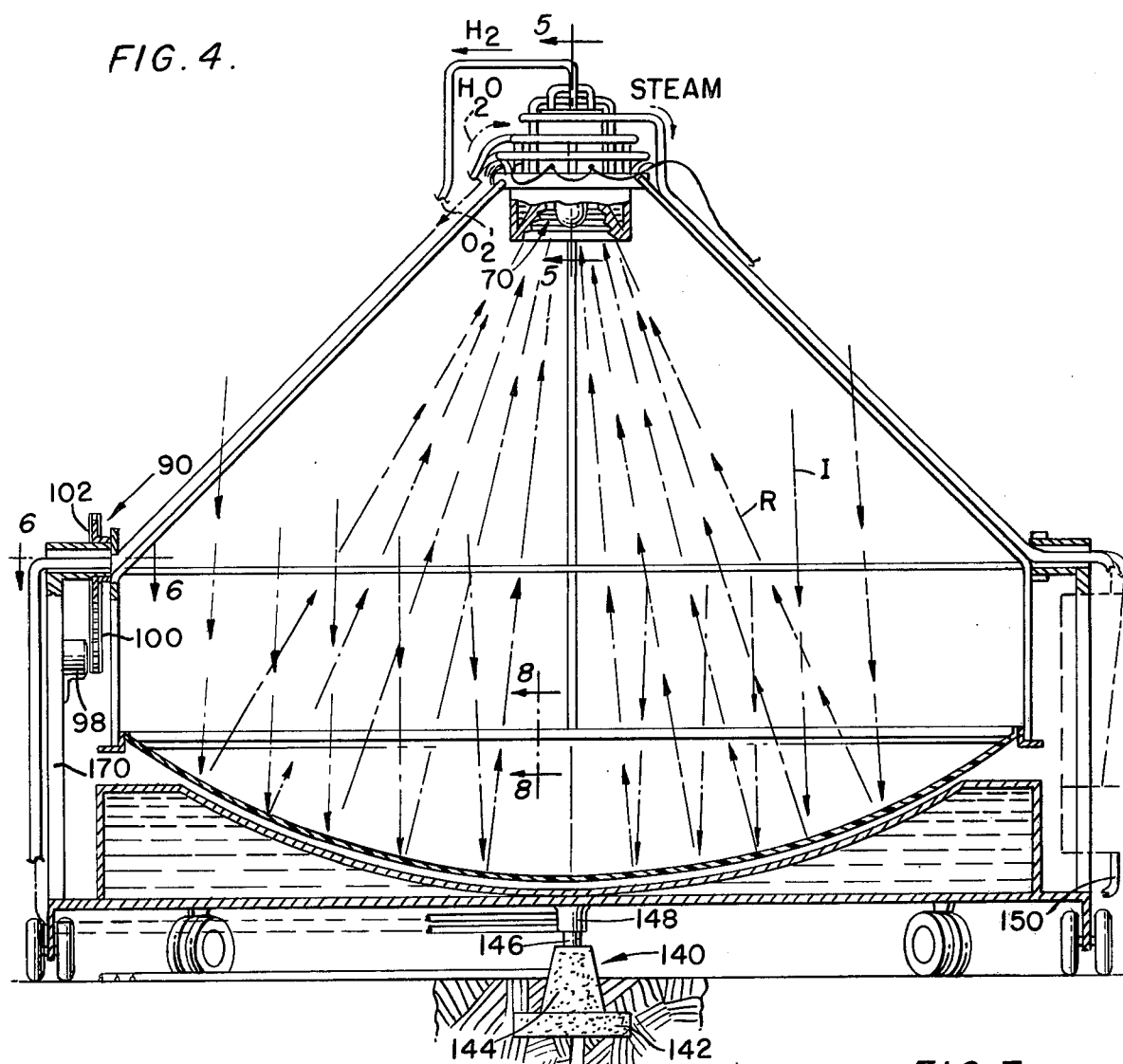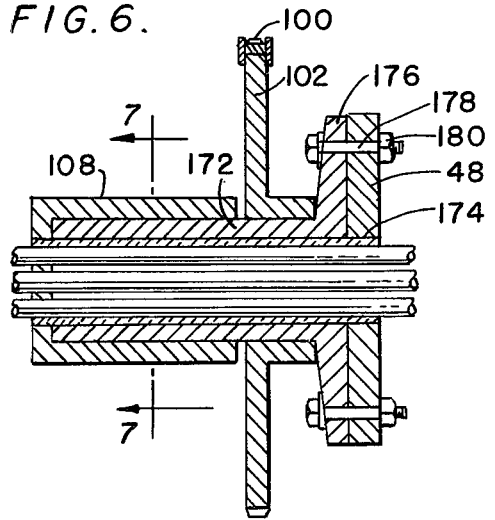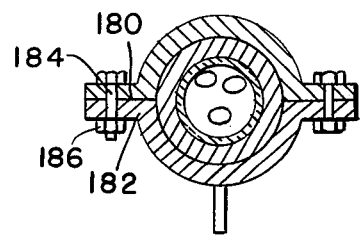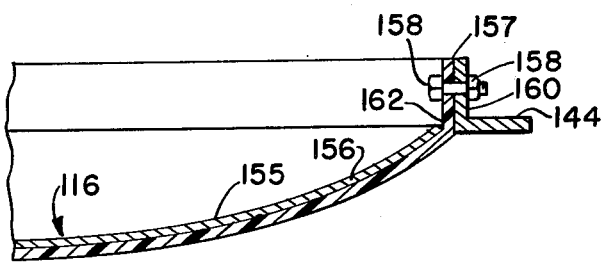

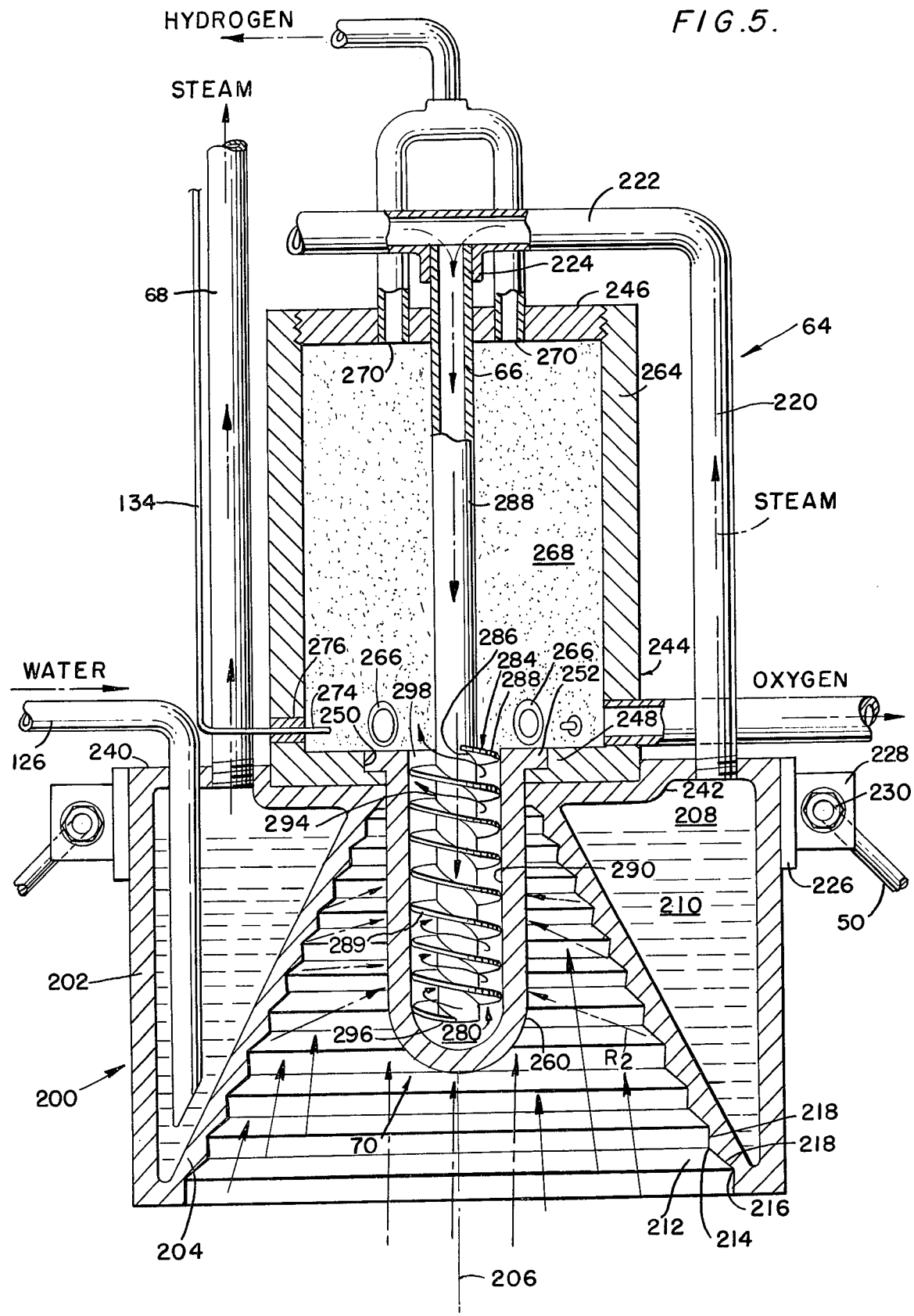

SOLAR POWER SYSTEM

BACKGROUND OF THE INVENTION

The present invention relates to separation of hydrogen and oxygen from water, and more particularly, to separation of hydrogen and oxygen from water using solar energy.

In recent years, advancements in the field of cryogenics have resulted in multiplying the number of potential uses for hydrogen and oxygen in their elemental forms, and has consequently increased the demands on existing supplies in these elements. For example, cryogenic surgery now routinely employs surgical procedures which were undreamed of a few years ago. Procedures utilized in preserving perishable items have also employed cyrogenic fluids. Furthermore, it is even possible to fuel automobiles or other vehicles with liquid hydrogen. The liquid forms of both hydrogen and oxygen have also been used in the field of rocket and jet propulsion.

Water is an abundant source of hydrogen and oxygen. However, because of the large bonding energies involved, efficient production of hydrogen and/or oxygen from water through dissociation or separation of hydrogen and oxygen from a water molecule is often prohibited.

The problems involved in the production of hydrogen and oxygen from water, is just one of the areas which has been affected by the steadily decreasing supplies of hydrocarbon fuels. In fact, the entire field of power generation has been severly affected by this shortage. Therefore, the supplies of hydrogen and oxygen are being squeezed from both ends, that is, greater demands are being placed on the supplies while means for increasing the supplies are inhibited by the shortage of available power sources.

Separation of hydrogen and oxygen from water at present generally occurs in devices using an electric discharge device or a combustion reaction. These devices, therefore, either directly or indirectly are dependent upon hydrocarbon fuel as an energy source. Furthermore, the energy source is inefficiently used as it is almost totally consumed in the dissociation process. Therefore, energy sources used to power the dissociation devices are capable of sustaining only the dissociation reaction, and are therefore inefficiently used.

The present invention uses solar energy as a power source for transforming water into steam and for dissociating that steam into hydrogen and oxygen.

SUMMARY OF THE INVENTION

The device of the present invention utilizes solar energy to transform water into steam through boiling and steam into hydrogen and oxygen through dissociation. Hence, hydrogen and oxygen are dissociated without relying on hydrocarbon fuels, and steam is available to drive auxiliary equipment, such as turbines, or the like.

The device of the present invention comprises a movable carriage on which a solar reflector is pivotally mounted. Means on the carriage moves the solar reflector so that it is properly oriented with respect to the sun to reflect solar energy onto a separating means connected to the solar reflector. The separating means comprises a housing mounted on the solar reflector and having a water storage area in which water is stored and heated by the transfer of heat from a reflecting surface which is oriented to receive solar energy reflected by the pivotally mounted solar reflector. The water is heated to the saturation temperature to form steam. A dissociating means is mounted on the housing and receives steam from the water storage means. The dissociating means includes a bullet-like chamber mounted on the housing in a location whereat it receives solar radiation reflected from the pivotally mounted solar reflector and from a solar reflecting surface on the water storage means. A body having a helical flange thereon is located inside the cylindrical housing, and the steam is introduced at one end of the housing. The steam then is forced to traverse a spiral path wherein it is exposed to the inner surface of the cylindrical housing, while the solar radiation is reflected upon the outer surface of the cylindrical housing so that the temperature of the steam is raised to the dissociation temperature thereof. A gas chamber is connected to the dissociating means and receives the dissociated hydrogen and oxygen. Withdrawal means, such as pipes, or the like, are connected to the gas chamber for removing the hydrogen and oxygen from the separating means.

The solar energy is focused on the separating means by the solar reflector, and that solar energy is used to boil the water and to dissociate the steam formed by the boiling water. Some of the solar energy is reflected twice, and some falls directly on the dissociating means. The dissociating means receives both that solar energy directly incident thereon and that solar energy which has been twice reflected. The evaporator receives only solar energy reflected from the pivotally mounted solar reflector.

Therefore, the evaporator transfers only enough energy to the water to boil the water and form steam, while the double source of solar energy incident upon the dissociation means supplies enough energy to that means to raise the temperature of the steam therein to the dissociation temperature.

Furthermore, the helically shaped body within the dissociating means forces the gas in the dissociating means to traverse a spiral path through that dissociating means. Therefore, dissociated hydrogen and oxygen are forced to traverse a spiral path, and are therefore subjected to centrifugal forces, from the entrance of the dissociating means to the exit thereof. The oxygen, being heavier then the hydrogen, therefore moves radially outward while forcing the hydrogen radially inward on the spiral path. The hydrogen and oxygen withdrawal means are located in the gas chamber so that the hydrogen withdrawal means is located nearer the center of the spiral path than is the oxygen withdrawal means. Therefore, hydrogen moves into the hydrogen withdrawal means, and oxygen moves into the oxygen withdrawal means. The withdrawal means are located so that the hydrogen and oxygen are withdrawn from the gas chamber before recombination thereof.

A turbine-generator set is mounted on the carriage and connected to the evaporator means to receive steam therefrom to drive the turbine. Therefore, the device of the present invention also serves as a solar power generating means.

Therefore, the device of the present invention is not dependent upon hydrocarbon fuels to supply the energy required to dissociate hydrogen and oxygen from water molecules. Furthermore, the energy is utilized in an efficient manner and can therefore be used to drive auxiliary equipment as well as perform the dissociation procedure. Therefore, the supplies of hydrogen and oxygen in their elemental forms can be increased without placing larger demands on supplies of hydrocarbon fuels, and those fuels can then be utilized for other purposes.

OBJECTS OF THE INVENTION

It is therefore a main object of the present invention to perform a procedure of dissociating hydrogen and oxygen from water molecules which, once started does not depend on hydrocarbon fuels.

Another object of the present invention is to dissociate hydrogen and oxygen from water molecules in a process wherein steam is generated for driving auxiliary equipment.

It is yet a further object of the present invention to dissociate hydrogen and oxygen from water molecules in a process wherein a solar reflector is always oriented to make the most efficient use of radiant energy from the sun.

BRIEF DESCRIPTION OF THE DRAWINGS

FIG. 4 is a view in section of FIG. 3 and is taken along line 4—4 of FIG. 3;

FIG. 5 is an enlarged view in section taken along line 5—5 of FIG. 4;

FIG. 6 is an enlarged view in section taken along line 6—6 of FIG. 4;

FIG. 7 is an enlarged view in section taken along line 7—7 of FIG. 4; and

FIG. 8 is an enlarged view taken in section taken along line 8—8 of FIG. 4.

DETAILED DESCRIPTION OF THE PREFERRED EMBODIMENT

Figure 1:
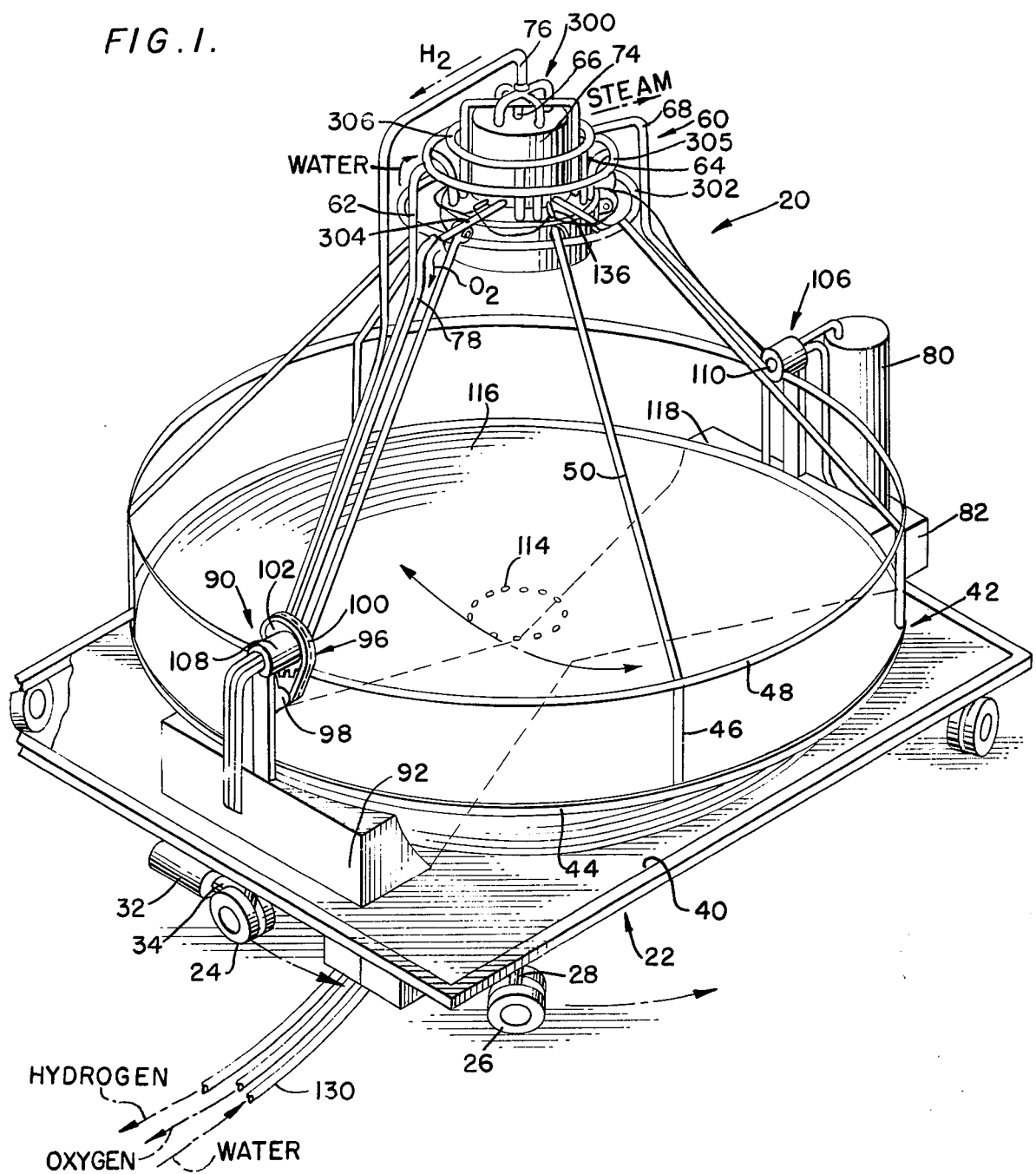
FIG. 1 is a perspective view of the device embodying the teachings of the present invention.

Shown in FIG. 1 is an apparatus 20 for separating hydrogen and oxygen from water molecules. The apparatus 20 comprises a movable carriage 22 having drive wheels 24 and idler wheels 26 connected to the carriage by braces 28 and which are used for placing the carriage in a desired orientation. An increment motor 32 is mounted on the undersurface of the carriage and is connected to drive wheels 24 by a connecting arm 34 for moving and adjusting those wheels according to a predetermined control program. The drive and idler wheels are in pairs which are connected by an axle. Pivotally mounted on carriage uppersurface 40 is a solar reflecting mirror 42 which has an upper marginal edge 44 thereon and is shaped in any suitable form, such as parabolic or hyperparabolic. A plurality of struts 46 are connected to upper marginal edge 44 and extend upwardly therefrom to support a ring 48 in a horizontal orientation with respect to upper marginal edge 44. A plurality of braces 50 are connected to the ring 48 and extend upwardly therefrom and radially inward of the mirror 42 toward a focal point of that mirror.

The braces 50 support a separating means 60 adjacent the mirror. Water is injected into separating means 60 via water conduit 62 and is stored therein. Solar energy incident upon mirror 42 is reflected thereby onto separating means 60 to boil the water therein to form steam. Steam formed in separating means 60 passes through steam line 64 into either dissociating means injector tube 66 or turbine inlet conduit 68. Flow of steam in line 64 into either tube 66 or conduit 68 is controlled by a check valve (not shown). Alternatively, a steam manifold can surround the separating means 60 and be appropriately connected to the separating means, through valves, or the like, to withdraw steam for the turbine. Steam injected into dissociating means 70 (FIG. 4) is heated by radiant energy reflected from mirror 42 to raise the temperature thereof to the dissociating temperature so that the water molecules are dissociated into hydrogen and oxygen. The hydrogen and oxygen are separated from each other, and the hydrogen is withdrawn from gas chamber 74 via hydrogen conduit 76, and the oxygen is withdrawn from the gas chamber 74 via oxygen conduit 78. The steam in turbine inlet conduit 68 is transferred into a turbine 80 comprising the usual turbine mechanical and electrical components, and which drives the generator 82 for producing electrical energy, or the like.

Mirror 42 is maintained in an orientation with respect to the sun so that, at any time during daylight hours, the maximum amount of solar energy is reflected onto separating means 60. Proper orientation of the mirror and the separating means is effected by movement of the drive wheels 24 by the motors 32 and by pivot means 90 mounted on water storage tank 92 and connected to ring 48 of mirror 42 by sprocket means 96. A sprocket motor 98 drives a chain 100 which drives a sprocket wheel 102 connected to ring 48. A pivot means 106 is also mounted on water storage tank 92 and connected to ring 48 so that movement of sprocket wheel 102 causes the mirror 42 to pivot about an axis through pivot point housings 108 and 110. Therefore, the mirror 42 can be pivoted in at least two planes so that it can be properly oriented with respect to the sun.

A plurality of thermocouples 114 are mounted in the mirror uppersurface 116 and are connected to a control panel 118 located on carriage 40 adjacent mirror 42. The thermocouples are located on mirror 42 to be in the shadow cast on that mirror by separating means 60 when the mirror is properly oriented to reflect incident solar energy onto the separating means 60. As the earth moves, the shadow cast on mirror surface 116 by separating means 60 will shift, and eventually uncover one or more of the thermocouples 114. When a thermocouple is exposed to incident solar energy, the temperature of that thermocouple begins to rise, and an electrical signal is sent to control panel 118. The control panel 118, in response to the electrical signal sent by the thermocouples, operates sprocket motor 98 and/or increment motors 32 to reorient mirror 42. The reorientation process is continued until all of the thermocouples 114 are in enough of a shadow to lower the temperature thereof to levels which indicate that the mirror is located in the most suitable orientation with respect to the sun. A proper control program can be utilized with control panel 118 to make the proper balances to locate the mirror 42 in the most suitable orientation. The control panel can also, according to a program or manually, control operation of the check valves in steam line 64.

Figure 2:
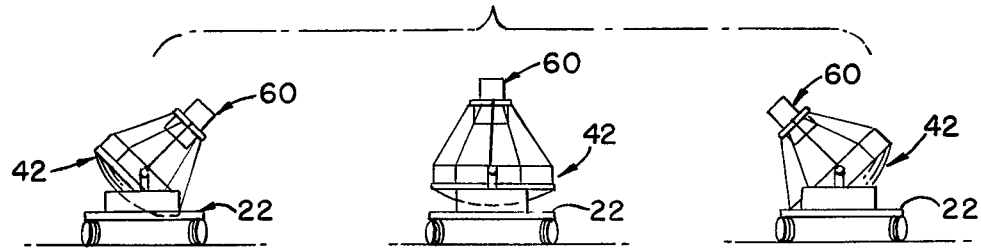
FIG. 2 is a schematic view of the device of the present invention in various attitudes with respect to a horizontal plane.
Figure 3:
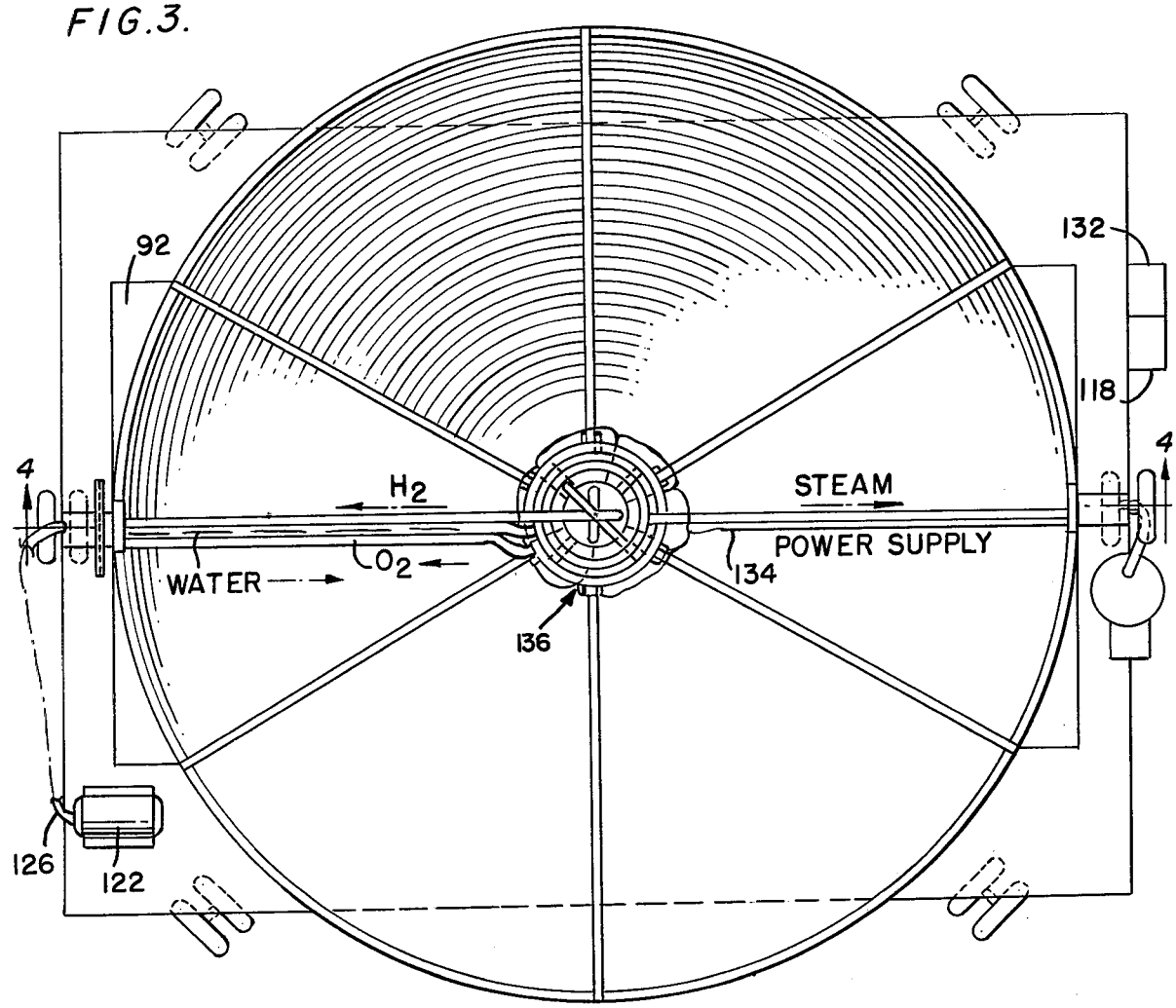
FIG. 3 is a plan view of the device embodying the teachings of the present invention.

FIG. 3 shows a top plan view of the apparatus 20, and indicates the shape of water-storage tank 92. The hourglass-like shape of water-storage tank 92 enables the mirror to freely pivot about the axis through pivot points 108 and 110 without contacting the water-storage tank. As shown in FIG. 2, the mirror can be pivoted on both sides of a vertical orientation of the mirror so that the mirror can track the sun as the earth turns. Furthermore, as shown in FIG. 3, a pump 122 is connected to carriage 22 and supplies water to separating means 60 via water supply conduit 126. Water is supplied to pump 122 and to tank 92 via water inlet conduit 130. Electrical energy required to start the dissociation process is supplied to the separating means 60 from a battery 132 via electrical connectors 134 and discharge device 136.

As shown in FIG. 4, carriage 22 rests on pivot means 140 which comprises a base 142 and a frusto conically shaped support 144 mounted thereon. A pivot shaft 146 having a cap 148 thereon connects the carriage 22 to the pivot means 140. The hydrogen, oxygen and waterlines are connected to the cap 148, as is turbine water return line 150. Water can also be supplied to the apparatus 20 via a water input line 154, which is buried in the ground and extends upwardly through the pivot means 140. The pivot means 140 is at the center of mass of the apparatus so that movement of the apparatus is easily effected. The solar reflecting mirror 42 is best shown in FIGS. 4 and 8.

As shown in FIG. 8, the reflector uppersurface 116 comprises a super reflective film 155 which is coated onto a ladel and then onto a glass fiber backing 156. The mirror 42 has a circumferential flange 157 which is bolted by means of bolts 157 and nuts 158 to annular flanges 160 having the upper surface thereof forming upper marginal edge 144 upon which struts 46 are mounted. In the preferred embodiment and annular flange 160 is aluminum. The flange 154 forms a ring 162 around reflective film 150. In the preferred embodiment, the mirror is disc-shaped and is approximately 10 meters in diameter to provide 78.54 square meters of reflective surface.

As shown in FIG. 4, the incident energy denoted as arrows I, is reflected from film 155 toward separating means 60. The reflected energy is denoted by arrows R.

Pivot means 90 is best shown in FIGS. 4, 6 and 7. As is shown in FIG. 4, sprocket motor 98 is mounted on support post 170 and drives chain 100 to rotate sprocket wheel 102. As shown in FIG. 6, sprocket 102 is fixedly secured to a hub 172 which is journaled to conduit tube 174 through which the oxygen, hydrogen, and waterlines pass. The pivot point housing 108 is fixed to the conduit tube 174. A flange 176 is bolted to ring 48 by bolts 178 and nuts 180. As shown in FIG. 4, the oxygen, hydrogen and waterlines pass conduit tube 174 to reach separator means 60 from the carriage 22. The sprocket drive motor in the preferred embodiment is an incremental motor which is controlled by control panel 118.

Thus, in response to signals from the control panel 118, the sprocket motor is operated to move the chain 100 and thus turn the sprocket wheel 102 to pivot the mirror 42 about the pivot axis through pivot housing 108 and 110. As shown in FIG. 7, housing 108 is comprised of a pair of keeper means 180 and 182 bolted together by bolts 184 and nuts 186.

The separator means is best shown in FIGS. 1 and 5. As shown in FIG. 5, the separator means comprises a housing 200 having an outer wall 202 and a conically shaped inner wall 204. The housing 200 has a longitudinal axis 206 and conical inner wall 204 forms a frusto conically shaped surface therearound. The inner wall 204, together with outer wall 202 forms a chamber 208 in which water 210 is fed via waterline 126 and is stored. The wall 204 forms a hollow cone about the longitudinal centerline 206 and has an inner surface 212 which is reflective and comprises a plurality of ridges along the length thereof. The ridges are formed by peaks 214 and valleys 216 connected by oppositely sloped surfaces 218. As will be discussed below, the radiant energy reflected from mirror 42 is incident upon reflective surface 212, and is reflected therefrom onto dissociating means 70.

The thickness and material of the inner wall 204 is arranged so that the radiant energy incident thereon transfers sufficient heat thereto to boil water 210. Therefore, chamber 208 forms a steam generator, and steam is withdrawn therefrom via steam lines 64 and 68. As shown in FIG. 5, steam line 64 comprises a vertical reach 220 and a horizontal reach 222 which is connected by a boss 224 to dissociating means injector tube 66. Therefore, the steam generator supplies steam to the dissociating means 70 and to the turbine 80. The steam thus generated can be used for either driving turbine 80 or for dissociating into hydrogen and oxygen, or both. Efficient use of the solar energy is therefore made by apparatus 20.

A supporting band 226 surrounds outer wall 202 and has lugs 228 connected thereto for connection to support braces 50 by locking means 230. In the preferred embodiment, the housing 200 is manufactured of stainless steel, or the like. The dissociating means 70 and the inner reflective surface 212 are formed of tungsten so that they will be able to withstand the temperatures required to dissociate hydrogen and oxygen from water molecules. Furthermore, the ridges are high chromed, plated and polished to produce the maximum reflection and to also hold down the energy input to the stainless steel casting to prevent that casting from melting at the high temperature levels achieved in the separating means 60.

As shown in FIG. 5, the upper surface 240 of housing 200 comprises a boss 242 into which is seated a gas chamber 244 having a removable end cap 246 threadably received thereon. The gas chamber 244 has a bottom 248 having an opening 250 therein for receiving flange 252 of the dissociating means 70 to seat same therein. The dissociating means 70 is a bullet-like hollow chamber depending downwardly from gas chamber bottom 248 along the longitudinal axis 206 of the housing 200. The ridges in surface 212 are shaped to reflect incident radiation onto the outer surface 260 of dissociating means 70. The radiation reflected by the ridges is denoted as $R_2$ in FIG. 5.

The gas chamber 244 comprises a vertical wall 264 having defined therein means 266 for withdrawing oxygen from chamber 268, and means 270 for withdrawing hydrogen from chamber 268. Electrodes 274 connected to battery 132 via electrical connectors 134 extend through seals 276 in walls 264 of the chamber 244. Surrounding injector tube 66 and located within chamber 280 of the dissociating means 70 is a spiral flange 284 which has an inner surface 286, contacting outer surface 288 of the injector tube 66 and outer edge 289 which contacts inner surface 290 of the dissociating means chamber 280. The helical flange 284 therefore forms a spiral path 294 through which steam from outlet means 296 of injector tube 66 must pass in order to exit the chamber 280 via outlet means 298.

Appropriate check valves, or other such elements (not shown), can be placed in the steam, hydrogen and oxygen lines to maintain the pressure in the separating and dissociating means at suitable levels.

While traversing the spiral path 294, the steam must contact the inner surface 290 of the dissociating means. The dissociating means is formed of a material having a thickness and a thermal conductivity selected to transfer sufficient heat from the radiation incident upon outer surface 260 to the steam which heat is sufficient to raise the temperature of the steam in chamber 280 to the dissociation temperature of that steam. Therefore, while traversing the spiral path 294, the steam is transformed into hydrogen and oxygen gases which are then forced out of outlet 298 into chamber 268.

While traversing the spiral path, the gases undergo circular movement and therefore subject the components thereof to centrifugal forces. As oxygen is heavier than hydrogen, oxygen moves radially outward while displacing the hydrogen radially inward toward centerline 206. As shown in FIG. 5, the oxygen outlet means 266 are located in the vertical walls 264 at the bottom of chamber 268, while hydrogen withdrawing means 270 are located near injector tube 66 at the top of the chamber. Therefore, the oxygen, being heavier then the hydrogen, has moved radially outward from centerline 206 and will be located closer to the bottom of the chamber 260 than the hydrogen. The appropriate withdrawal means are therefore located at a position to receive the hydrogen and the oxygen separated by separating means 60.

As shown in FIG. 1, the hydrogen withdrawal means comprises four conduits connected together to form a branched header 300 for hydrogen conduits 76, and ring manifold 302 is connected by radial conduits 304 to form a header for oxygen conduit 98. Ring manifolds 305 and 306 form hydrogen headers. It is noted that there are two headers for hydrogen for each oxygen header as there is twice as much hydrogen produced as oxygen in this dissociation reaction. If a steam header is used, it also can be a ring-type header surrounding the separating means, as do manifolds 302–306, with appropriate radial conduits, or the like, connecting that manifold to the separating means so that steam from chamber 208 can be conducted thereinto through valves, or the like, which are controlled either manually or remotely, such as by controls on panel 118 to shunt steam thereinto when needed.

An auxiliary start-up system comprises the electrodes 274 and the battery 132. Water is injected into chamber 208 by pump 122 via conduit 126, and solar energy boils this water to form steam. Some of the steam is conducted to the turbine generator assembly, and some of the steam is injected into the dissociating means. The electrodes 274 are fired to produce sufficient energy to dissociate the steam in the dissociating means while the rest of the water in chamber 208 is being heated. As soon as the water in chamber 208 is heated to predetermined levels, the temperatures in chamber 280 will have reached levels sufficient to dissociate the steam injected therein, and the auxiliary dissociating means comprising electrodes 274 is no longer required. Therefore, once started, the apparatus embodying the present invention is self perpetuating and does not rely on hydrocarbon fuels to supply the energy required to dissociating hydrogen and oxygen from water molecules. Instead, solar energy is utilized to supply the heat required to raise the steam in dissociating chamber 280 to levels sufficient to dissociate the hydrogen and oxygen therefrom. Pump 122 can also be driven by battery 132 at various times to boost the pressure in chamber 208 when desired. Furthermore, check valves (not shown) can be inserted into the various conduits, such as steamline 68 or steamline 64, to control the flow therethrough and to shunt more steam to one or the other of the turbines or dissociating means.

As shown in FIG. 1, the turbine generator assembly receives steam from the separating means 60, and as shown in FIG. 4, steam from the turbine 80 can be re-injected into the system via turbine water return line 150. The hot steam in line 150 serves to preheat the water being forced into chamber 208 to efficiently use the energy generated in this apparatus. The generator 80 can be used to drive other electrically powered devices and/or recharge battery 132, or to power control panel 118.

The oxygen and hydrogen conduit can be routed around the apparatus and then extend outwardly to compressor or other such devices. In this manner, the heat given off by these lines can be utilized to preheat the water being injected into chamber 208 to thereby make sufficient use of the heat generated by the apparatus 20.

In operation, start-up of the apparatus is effected using the discharge devices 136. Solar energy incident on mirror 42 is reflected thereby onto inner surface 212 to heat water inducted into chamber 208 via waterline 126 and to be reflected onto surface 260 of the dissociating means 70 to heat steam inducted into chamber 280 thereof. Steam is inducted into chamber 280 via steam lines 64 and injector 66. The steam in chamber 280 is forced to transverse a spiral path by a helical flange and is thereby forced to undergo rotational movement which compacts the inner surface of the chamber 280. Solar energy reflected from mirror 42 and from surface 212 is incident upon the outer surface 260 and the heat generated thereby is transferred to the inner surface 290 of the chamber 280 to heat the steam therein to the dissociation temperature of water. The hydrogen and oxygen dissociated in chamber 280 undergo rotational movement to force the heavier oxygen toward the outside of the chamber and the lighter hydrogen toward the inside of the chamber. Withdrawing means are located in gas chamber 244 at positions to receive the hydrogen and oxygen and withdraw same from the chamber 268. The hydrogen and oxygen are then moved to appropriate locations. The steam not used in the dissociation process can be used to drive a turbine generator set via a steam line 68.

A control program controls the movement of the device in a manner such that, during the daylight hours, the mirror is oriented at a location which makes maximum use of the solar energy incident thereon. The control program moves the mirror as the angle of the sun is changed by rotation of the earth. The mirror is then reset during the night hours to recapture incident radiation at sunrise. The start-up procedure is then initiated, then shut down when the solar energy is sufficient to make the apparatus self perpetuating, and the process continued. The energy generated by the turbine generator set is used in any suitable manner, and the hydrogen and oxygen generated by the apparatus 20 is also used in any suitable manner.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. Apparatus for separating hydrogen and oxygen from water comprising:
    a housing exposed to incident solar energy and having defined therein a chamber for storing water;
    means for conducting water into said chamber;
    a solar energy reflecting means for reflecting solar energy toward said housing;
    first heat transfer means located on said housing to receive said incident solar energy and be heated thereby to form a first source of heat energy, said first heat transfer means being connected to said chamber in a manner such that said heat energy from said first source is transferred to water in said chamber in amounts sufficient to boil same to produce steam;
    solar energy reflecting means connected to said first heat transfer means for reflecting part of said incident solar energy to form reflected solar energy;
    separating means connected to said housing and connected to said chamber to receive steam therefrom, said separating means having second heat transfer means positioned thereon to receive said incident and said reflected solar energy and be heated thereby to form a second source of heat energy, said second heat transfer means being connected to said separating means and transferring heat from said second source of heat energy to said steam in amounts sufficient to separate said steam into hydrogen and oxygen components;
    said separating means including a case connected to said housing having means therein for defining an arcuate path over which said hydrogen and oxygen components pass for creating rotational movement of said hydrogen and oxygen components to separate same by centrifugal forces generated thereon by said rotational movement and
    removal means on said housing for removing said separated hydrogen and oxygen components from said separating means.

2. The apparatus of claim 1 wherein said solar energy refecting means includes a movable solar reflector mirror and moving means connected to said solar reflector mirror for moving said solar reflector mirror so that it will be exposed to radiant energy during substantially all daylight hours.

3. The apparatus of claim 1 wherein said removal means includes hydrogen removing means located on said housing to receive said hydrogen and oxygen removing means located on said housing to receive said oxygen.

4. The apparatus of claim 3 further including start-up means having an electrical energy discharge means located on said separating means to discharge energy into said steam in amounts sufficient to separate hydrogen and oxygen from each other, an electrical energy source connected to said discharge means, and means for controlling said start-up means for actuating same to start said electrical energy discharge at predetermined times and to stop same when heat energy in sufficient amounts to separate oxygen and hydrogen from each other is transferred to said steam by said second source of heat energy.

5. The apparatus of claim 2 further including a movable carriage supporting said solar energy reflecting means and wherein said housing is connected to said solar energy reflecting means.

6. The apparatus of claim 5 further including means for moving said carriage.

7. The apparatus of claim 6 further including a turbine-generator set mounted on said carriage and connected to said chamber to receive steam therefrom to drive said turbine.

8. The apparatus of claim 1, wherein said arcuate path is spiral.

9. An apparatus for separting hydrogen and oxygen from water, comprising:
    a solar reflector having a central axis;
    mounting means for mounting said solar reflector including moving means for moving said solar reflector in two planes, including rotating means on said mounting means for rotating said solar reflector in one plane, and moving means mounted on said mounting means for moving said solar reflector in a second plane so that said solar reflector will reflect solar energy;
    dissociating means for dissociating hydrogen and oxygen from water, said dissociating means being mounted on said solar reflector in a location to receive solar energy reflected thereby, and including a solar energy reflecting means positioned to receive solar energy reflected by said solar reflector and reflecting part of that solar energy onto said dissociating means, evaporating means for concentrating said reflected solar energy onto water located therein to boil said water to form steam, and dissociating means for concentrating solar energy onto said steam until the temperature of said steam corresponds to the dissociation temperature of said steam thereby dissociating hydrogen and oxygen from said steam;
    means for conducting water into said evaporating means;
    means on said evaporating means for conducting steam into said dissociating means;
    means for separating said hydrogen and oxygen from each other which includes means for defining a spiral path over which said hydrogen and oxygen flow in a manner which creates centrifugal forces to separate said components from each other; and
    means connected to said dissociating means for withdrawing said hydrogen and oxygen therefrom.

10. A device for separating hydrogen and oxygen from water comprising:
    a housing;
    evaporator means on said housing for boiling water contained therein to form steam;
    means connected to said housing for transferring water into said evaporator means;
    first solar concentrating means for concentrating solar energy onto said evaporator means to heat said water to evaporate same;
    separator means on said housing for dissociating said steam to form hydrogen and oxygen said separator means having reflecting means thereon for reflecting solar energy focused thereon by said first solar concentrating means;

second solar concentrating means for concentrating solar energy onto said separator means to raise the temperature of said steam to dissociate same;

steam transfer means on said evaporator for transferring steam from said evaporator means to said separator means;

a means on said separator means defining a spiral path over which said hydrogen and oxygen pass, said spiral path causing said hydrogen and oxygen to have rotational motions so that centrifugal forces generated thereby separate said components from each other;

hydrogen transfer means on said separator means for withdrawing said hydrogen from said separator means; and oxygen transfer means on said separator means for withdrawing said oxygen from said separator means.

* * * * *